(12) United States Patent
Grigsby et al.

(10) Patent No.: US 7,191,832 B2
(45) Date of Patent: Mar. 20, 2007

(54) GRAVEL PACK COMPLETION WITH FIBER OPTIC MONITORING

(75) Inventors: Tommy Grigsby, Houma, LA (US); Bruce Techentien, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 77 days.

(21) Appl. No.: 10/680,440

(22) Filed: Oct. 7, 2003

(65) Prior Publication Data

US 2005/0074196 A1    Apr. 7, 2005

(51) Int. Cl.
  *E21B 43/04*    (2006.01)
  *E21B 23/00*    (2006.01)
(52) U.S. Cl. .................. 166/278; 166/378; 166/386; 166/77.1
(58) Field of Classification Search ............. 166/278, 166/378, 205, 385, 386, 242.7, 77.1, 77.2; 385/100
See application file for complete search history.

(56) References Cited

U.S. PATENT DOCUMENTS

| | | |
|---|---|---|
| 4,134,455 A | 1/1979 | Read |
| 4,375,237 A | 3/1983 | Churchman |
| 4,442,893 A | 4/1984 | Foust |
| 4,483,584 A | 11/1984 | Gresty |
| 4,624,309 A | 11/1986 | Schnatzmeyer |
| 4,690,212 A | 9/1987 | Termohlen |
| 4,756,595 A | 7/1988 | Braun et al. |
| 4,757,859 A | 7/1988 | Schnatzmeyer |
| 4,825,946 A | 5/1989 | Schnatzmeyer |
| 4,828,027 A | 5/1989 | Schnatzmeyer |
| 4,846,269 A | 7/1989 | Schnatzmeyer |
| 4,887,883 A | 12/1989 | Darbut et al. |
| 4,921,438 A | 5/1990 | Godfrey et al. |
| 5,048,610 A | 9/1991 | Ross et al. |
| 5,251,708 A | 10/1993 | Perry et al. |
| 5,435,351 A | 7/1995 | Head |
| 5,505,260 A * | 4/1996 | Andersen et al. ............ 166/278 |
| 5,577,925 A | 11/1996 | Schnatzmeyer et al. |
| 5,645,438 A | 7/1997 | Cairns |
| 5,727,630 A | 3/1998 | Brammer |
| 5,778,978 A | 7/1998 | Crow |
| 5,803,167 A | 9/1998 | Bussear et al. |
| 5,831,156 A | 11/1998 | Mullins |

(Continued)

FOREIGN PATENT DOCUMENTS

GB    2318397    4/1998

(Continued)

OTHER PUBLICATIONS

Search Report for United Kingdom application No. GB 0507890.2.

(Continued)

*Primary Examiner*—David Bagnell
*Assistant Examiner*—Shane Bomar
(74) *Attorney, Agent, or Firm*—Marlin R. Smith (57) ABSTRACT

A gravel pack completion with fiber optic monitoring. In a described embodiment, a method for completing a subterranean well includes the steps of: positioning at least one assembly in a wellbore of the well; then inserting a portion of a tubular string into the assembly; and attaching a fiber optic line to the tubular string portion.

39 Claims, 4 Drawing Sheets

U.S. PATENT DOCUMENTS

| | | | |
|---|---|---|---|
| 5,947,198 | A | 9/1999 | McKee et al. |
| 6,006,828 | A | 12/1999 | Kluth et al. |
| 6,017,227 | A | 1/2000 | Cairns et al. |
| 6,062,073 | A | 5/2000 | Patton et al. |
| 6,152,608 | A | 11/2000 | Ghara et al. |
| 6,186,229 | B1 | 2/2001 | Martin et al. |
| 6,281,489 | B1* | 8/2001 | Tubel et al. ............ 250/227.14 |
| 6,302,203 | B1 | 10/2001 | Rayssiguier et al. |
| 6,325,146 | B1 | 12/2001 | Ringgenberg et al. |
| 6,332,787 | B1 | 12/2001 | Barlow et al. |
| 6,349,770 | B1 | 2/2002 | Brooks et al. |
| 6,378,610 | B2 | 4/2002 | Rayssiguier et al. |
| 6,439,778 | B1 | 8/2002 | Cairns |
| 6,464,405 | B2 | 10/2002 | Cairns et al. |
| 6,478,091 | B1 | 11/2002 | Gano |
| 6,527,052 | B2 | 3/2003 | Ringgenberg et al. |
| 6,568,481 | B2 | 5/2003 | Koehler et al. |
| 6,666,274 | B2 | 12/2003 | Hughes |
| 6,684,950 | B2 | 2/2004 | Patel |
| 6,736,545 | B2 | 5/2004 | Cairns et al. |
| 6,758,271 | B1* | 7/2004 | Smith ...................... 166/250.1 |
| 6,758,272 | B2 | 7/2004 | Bixenman et al. |
| 6,766,853 | B2 | 7/2004 | Restarick et al. |
| 6,776,636 | B1 | 8/2004 | Cameron et al. |
| 6,837,310 | B2* | 1/2005 | Martin ....................... 166/297 |
| 6,874,361 | B1 | 4/2005 | Meltz et al. |
| 6,933,491 | B2 | 8/2005 | Maida et al. |
| 6,951,252 | B2* | 10/2005 | Restarick et al. ........... 166/313 |
| 6,983,796 | B2 | 1/2006 | Bayne et al. |
| 2002/0014340 | A1 | 2/2002 | Johnson |
| 2002/0125008 | A1 | 9/2002 | Wetzel et al. |
| 2002/0162666 | A1 | 11/2002 | Koehler et al. |
| 2003/0141075 | A1 | 7/2003 | Bixenman et al. |
| 2003/0192708 | A1 | 10/2003 | Koehler et al. |
| 2003/0196820 | A1* | 10/2003 | Patel .......................... 166/387 |
| 2003/0213598 | A1 | 11/2003 | Hughes |
| 2004/0065439 | A1* | 4/2004 | Tubel et al. ........... 166/250.15 |
| 2004/0173350 | A1 | 9/2004 | Wetzel et al. |
| 2004/0256127 | A1* | 12/2004 | Brenner et al. ........... 174/21 R |
| 2005/0072564 | A1* | 4/2005 | Grigsby et al. ............ 166/65.1 |
| 2005/0092501 | A1 | 5/2005 | Chavers et al. |
| 2005/0109518 | A1* | 5/2005 | Blacklaw .................... 166/383 |

FOREIGN PATENT DOCUMENTS

| | | |
|---|---|---|
| WO | WO 86/02173 | 4/1986 |
| WO | WO 03/046428 | 6/2003 |

OTHER PUBLICATIONS

Office Action for U.S. Appl. No. 10/680,053 dated Mar. 8, 2005.
Office Action for U.S. Appl. No. 10/680,625 dated Jan. 26, 2005.
Halliburton, "X-Line® and R-Line® Landing Nipples and Lock Mandrels; Set and Lock Reliability in Subsurface Flow Control Equipment with a Total Completion Package", dated Mar. 1997.
Focal Technologies Corporation, Product Brochure for Model 286, dated Apr. 15, 2003.
Office Action for U.S. Appl. No. 10/680,053 dated Jun. 11, 2004.
U.S. Appl. No. 10/680,053, filed Oct. 7, 2003.
U.S. Appl. No. 10/828,085, filed Apr. 20, 2004.
U.S. Appl. No. 10/680,625, filed Oct. 7, 2003.
U.S. Appl. No. 10/790,908, filed Mar. 2, 2004.
The Expro Group brochure, "Tronic Fibre Optic Wellhead Feedthrough Connectors", undated.
Seacon brochure, "Fiber Optic Connectors", undated.
Ocean Design, Inc. brochure, "NRH Connector", undated.
Ocean Design, Inc. brochure, "Hybrid Wet-Mate", 2000.
Ocean Design, Inc. brochure, "I-CONN; Wet-Mateable Optical Connector", 2000.
Seacon Advanced Products data sheets, pp. 22-1 through 22-20, Apr. 2004.
International Search Report for PCT/US04/01857.
Office Action for U.S. Appl. No. 10/680,053 dated Nov. 8, 2004.
Intelligent Wells, "Optical Fiber Technology," dated Oct. 2002.
Intelligent Wells, "Oil Field Applications of Hydroptics Technology," dated Oct. 2002.
World Oil, "World's First Multiple Fiber-Optic Intelligent Well," dated Mar. 2003.
Underwater Magazine, "Underwater Mateable Connectors in the Military and Telecom Sectors," dated Sep./Oct. 2002.
Sea Technology, "The Ruggedization of Hybrid Wet-Mate Connectors," dated Jul. 2000.
Sea Technology, "Optical Fiber and Connectors: Critical for Future Subsea Systems," undated.
OTC 15323, "The Developement and Application of HT/HP Fiber-Optic Connectors for use on Subsea Intelligent Wells," dated 2003.
Journal of Petroleum Technology, "Development of HP/HT Fiber-Optic Connectors for Subsea Intelligent Wells," dated Aug. 2003.
Sea Technology, "Hybrid Wet-Mate Connectors: 'Writing the Next Chapter'," dated Jul. 1997.
Tronic, "Tronic Fibre Optic Wellhead Feedthrough Connectors," undated.
Tronic, "Firefly Project," undated.
OTC 13235, "Extending Tieback Distances: Wet-Mate Connectors, Enabling Technologies for Critical Systems Developments," dated 2001.
Ocean Design, "Underwater Mateable Connectors: Enabling Technology and the Next Step in Performance for Navy and Telecom Applications," Presented at Underwater Intervention Conference, 2002.
W Magazine, "Intelligent Well Completion, The Next Steps," dated Sep. 2002.
Production Optimization, "Intelligent Completions," undated.
Seacon, "Microstar, 4-Channel, Wet-Mate, Optical Connector," undated.
Ocean Design, Inc., "Ocean Design Introduces New I-Conn Product Line," dated Jul. 22, 2002.
Weatherford, "Intelligent Well Briefing," dated May 14, 2003.
"Pioneering Fibre Optic Completion Installation in the Mahogany Field, Offshore Trinidad," undated.
PES, "Model fo Fibre Optic Orientating Disconnect Head," dated Oct. 23, 2000.
SPE 71676, "The Use of Fiber-Optic Distributed Temperature Sensing and Remote Hydraulically Operated Interval Control Valves for the Management of Water Production in the Douglas Field," dated 2001.
SPE 84324, "Brunei Field Trial of a Fibre Optic Distributed Temperature Sensor (DTS) System in a 1,000 m Open Hole Horizontal Oil Producer," dated 2003.
Search Report for PCT/US04/01863.
Search Report for PCT/US04/01856.
U.S. Appl. No. 10/873,849, filed Jun. 22, 2004.
Norfolk Wire & Electronics, "Optical Fiber Splice Protectors—FSP", dated 2003.
Office Action for U.S. Appl. No. 10/680,625 dated Jun. 27, 2005.
Office Action for U.S. Appl. No. 10/680,053 dated Jul. 6, 2005.
Otis Engineering drawing No. 41UP58701 dated May 4, 1993.
Halliburton Energy Services drawing No. 42 oo 210 dated Apr. 7, 2001.
Halliburton presentation entitled, "DTS Conceptual Completions", Dec. 3, 2002.
Halliburton presentation entitled, "Greater Plutonio Completions Workshop", Mar. 12, 2003.
Office action for U.S. Appl. No. 10/680,053 dated Oct. 21, 2005.
Office Action for U.S. Appl. No. 10/680,625 dated Mar. 9, 2006.
Office Action for U.S. Appl. No. 10/790,908 dated Mar. 14, 2006.
Office Action for U.S. Appl. No. 10/828,085 dated Mar. 22, 2006.
Office Action for U.S. Appl. No. 11/038,369 dated Feb. 14, 2006.
Office Action for U.S. Appl. No. 11/038,369 dated Jul. 11, 2006.
International Preliminary Report on Patentability for PCT/US2004/001863.
International Preliminary Report on Patentability for PCT/US2004/001856.
International Preliminary Report on Patentability for PCT/US2004/001857.

Written Opinion for PCT/US2004/001863.
Written Opinion for PCT/US2004/001856.
Written Opinion for PCT/US2004/001857.

Office Action for U.S. Appl. No. 10/873,849 dated May 5, 2006.

* cited by examiner

GRAVEL PACK COMPLETION WITH FIBER OPTIC MONITORING

CROSS-REFERENCE TO RELATED APPLICATIONS

The present application is related to the following copending applications filed concurrently herewith: application Ser. No. 10/680,625, entitled DOWNHOLE FIBER OPTIC WET CONNECT AND GRAVEL PACK COMPLETION; and application Ser. No. 10/680,053, entitled GRAVEL PACK COMPLETION WITH FLUID LOSS CONTROL AND FIBER OPTIC WET CONNECT. The entire disclosures of these related applications are incorporated herein by this reference.

BACKGROUND

The present invention relates generally to equipment utilized and operations performed in conjunction with subterranean wells and, in an embodiment described herein, more particularly provides a gravel pack completion with fiber optic monitoring.

It would be very desirable to be able to use a fiber optic line to monitor production from a well, for example, to monitor water encroachment, identify production sources, evaluate stimulation treatments, gravel packing effectiveness and completion practices, etc. It is known to use fiber optic lines to transmit indications from downhole sensors, to communicate in the downhole environment and to use a fiber optic line as a sensor.

However, fiber optic lines may be damaged in operations such as gravel packing, expanding tubulars downhole, etc. For this reason, it would be beneficial to be able to install a fiber optic line in a completion, for example, after a completion assembly has been installed in a well and gravel packing operations are completed, or after an assembly has been expanded, etc.

Furthermore, it is sometimes desirable to complete a well in sections or intervals, for example, where a horizontal well is gravel packed in sections, or where zones intersected by a vertical well are separately gravel packed. In these cases, it would be beneficial to be able to conveniently install a fiber optic line in each of the gravel packed sections.

SUMMARY

In carrying out the principles of the present invention, in accordance with described embodiments thereof, systems and methods are provided which permit a fiber optic line to be conveniently installed in an assembly previously installed in a well.

In one aspect of the invention, a method for completing a subterranean well is provided. The method includes the steps of: positioning at least one assembly in a wellbore of the well; then inserting a portion of a tubular string into the assembly; and attaching a fiber optic line to the tubular string portion.

In another aspect of the invention, a system for completing a subterranean well is provided. The system includes an assembly positioned in a wellbore of the well. A portion of a tubular string is inserted into the assembly after the assembly is positioned in the wellbore. A fiber optic line is attached to the tubular string portion.

In yet another aspect of the invention, a system for completing a subterranean well includes at least first and second assemblies positioned in a wellbore of the well. A tubular string has a portion thereof inserted into both of the first and second assemblies after the first and second assemblies are positioned in the wellbore. A fiber optic line is attached to the tubular string portion.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
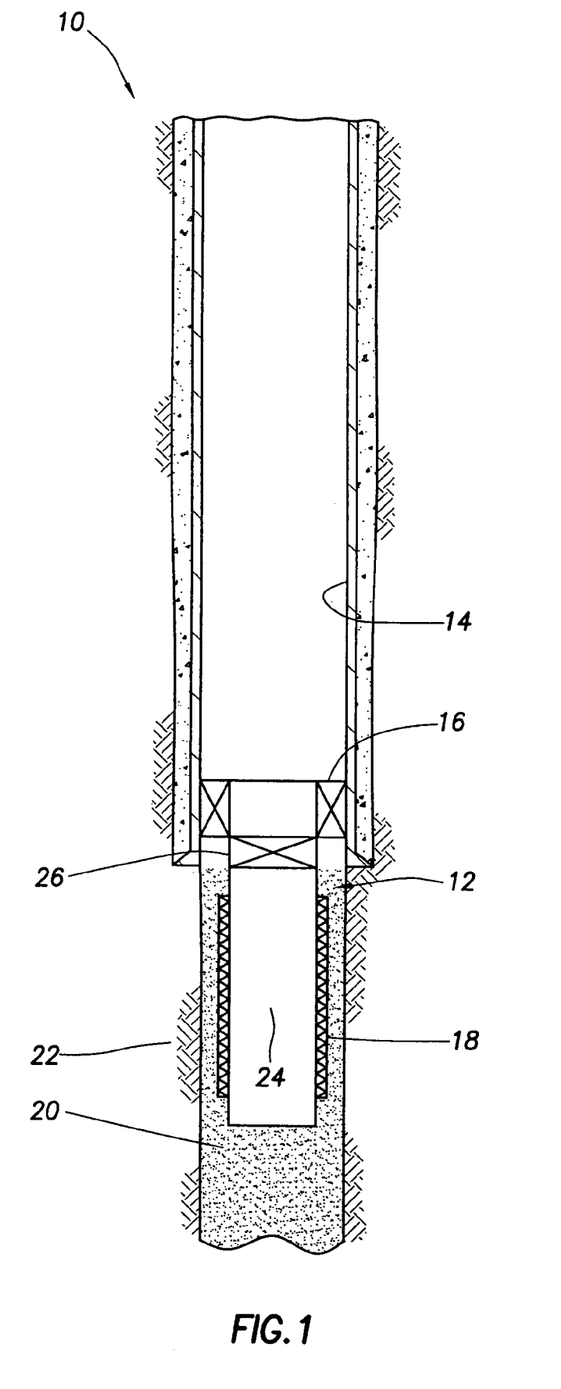
FIG. 1 is a schematic cross-sectional view of a system and method embodying principles of the present invention, in which initial steps of the method have been performed.

Representatively illustrated in FIG. 1 is a system and method 10 which embodies principles of the present invention. In the following description of the system and method 10 and other apparatus and methods described herein, directional terms, such as "above", "below", "upper", "lower", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

As depicted in FIG. 1, a gravel packing assembly 12 has been positioned in a wellbore 14. Representatively, a gravel pack packer 16 of the assembly 12 is set in a cased portion of the wellbore 14, and a well screen 18 of the assembly is positioned in an uncased portion of the wellbore. However, it should be clearly understood that any or all of the gravel packing assembly 12 may be positioned in either a cased or an uncased wellbore or wellbore portion.

Gravel 20 is flowed into an annulus formed between the screen 18 and the wellbore 14. Fluid in a formation or zone 22 intersected by the wellbore 14 can flow through the gravel 20, through the screen 18 and into an internal flow passage 24 of the assembly 12. A conventional gravel packing service tool (not shown) may be used to flow the gravel 20 into the annulus between the screen 18 and the wellbore 12, in a manner well known to those skilled in the art.

When the service tool is removed from the assembly 12, a fluid loss control device 26 of the assembly prevents fluid in the wellbore 14 above the assembly from flowing into the formation 22 via the passage 24. The fluid loss control device 26 may be a Model FSO device available from Halliburton Energy Services of Houston, Tex., in which case the device may prevent flow therethrough in each direction when closed.

As depicted in FIG. 1, the fluid loss control device 26 is closed (preventing flow into the formation 22), but the fluid loss control device may be configured to permit upward flow through the passage 24, in the manner of a check valve, if desired. When open, the fluid loss control device 26 permits fluid flow from the passage 24 into the formation 22.

Note that the fluid loss control device 26 may be configured other than as shown in FIG. 1. For example, the fluid loss control device 26 may be incorporated into the screen 18, in which case the device may permit inward flow through the screen between the formation 22 and the passage 24, while preventing outward flow through the screen between the passage and the formation, in the manner of a check valve. If incorporated into the screen 18, the device 26 may be unaffected by the retrieval of the service tool from the assembly 12.

Figure 2:
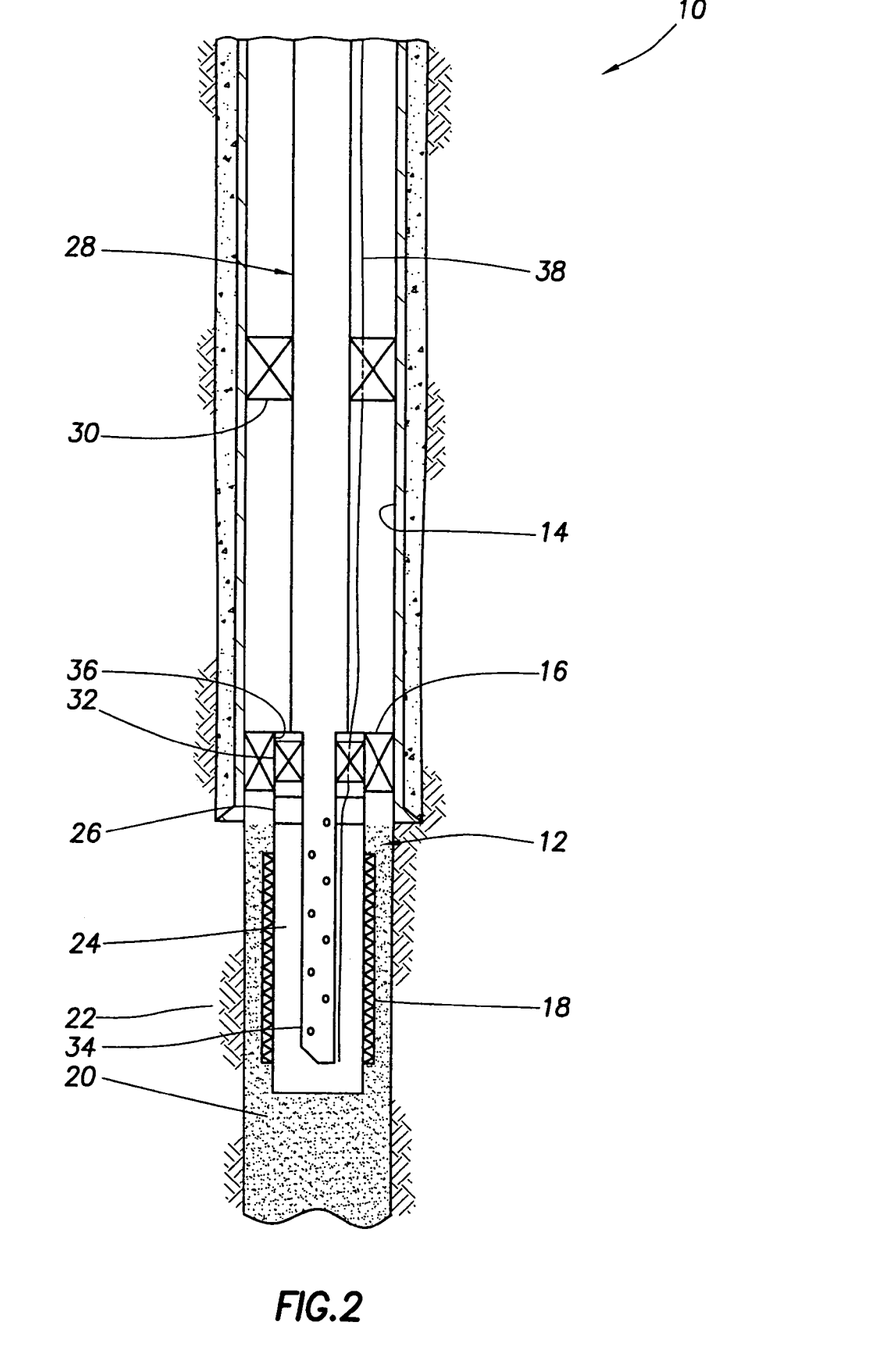
FIG. 2 is a schematic cross-sectional view of the system and method of FIG. 1, in which further steps of the method have been performed.

Referring additionally now to FIG. 2, a tubular string 28, such as a production tubing string, is installed in the wellbore 14. The tubular string 28 includes a packer 30 and a sealing device 32, such as a packing stack or a seal assembly. The packer 30 is set to sealingly secure the tubular string 28 in the wellbore 14.

A lower portion 34 of the tubular string 28 extends into the passage 24 of the assembly 12, and the sealing device 32 sealingly engages a seal bore 36, such as a polished bore receptacle, associated with the packer 16. Preferably, the tubular string portion 34 is perforated to permit or enhance flow into the tubular string 28 from the passage 24.

When the lower portion 34 is inserted into the assembly 12, the fluid loss control device 26 may open, permitting flow therethrough in each direction. However, it should be understood that the fluid loss control device 26 may be opened before, during or after the lower portion 34 is inserted into the assembly 12. Of course, if the fluid loss control device 26 is incorporated into the screen 18, insertion of the portion 34 into the assembly 12 may not affect operation of the fluid loss control device.

Attached to the tubular string 28 is a fiber optic line 38. The fiber optic line 38 may, for example, be encased in a cable, or it may be in a conduit as described in further detail below. Any means of attaching the fiber optic line 38 to the tubular string 28 may be used, in keeping with the principles of the invention.

The fiber optic line 38 extends longitudinally through the packer 30, and also extends longitudinally through the sealing device 32. If the fiber optic line 38 is contained in a conduit, portions of the conduit may be formed in the packer 30 and sealing device 32, and then the fiber optic line may be passed through the conduit in these elements before, during or after the tubular string 28 is run into the wellbore 14.

Note that the fiber optic line 38 extends longitudinally in the passage 24 within the screen 18. In this manner, the fiber optic line 38 may be used to monitor well parameters, such as temperature, pressure, flow rate, water cut, fluid identification, etc. For this purpose, the fiber optic line 38 may have appropriate sensors connected thereto and/or the fiber optic line may itself serve as a sensor, for example, using Bragg gratings on the fiber optic line.

As depicted in FIG. 2, the fiber optic line 38 is attached to an exterior of the tubular string 28. However, it should be understood that the fiber optic line 38, or any portion of the fiber optic line, may be positioned internal or external to the tubular string 28 in keeping with the principles of the invention.

It may now be fully appreciated that the system 10 permits the fiber optic line 38 to be conveniently installed in the assembly 12 after the gravel packing operation is completed. This helps to prevent damage to the fiber optic line 38. Convenient installation of the fiber optic line 38 (or at least the conduit therefor) is provided by installing it along with the tubular string 28, which would normally be run subsequent to the gravel packing operation.

Figure 3:
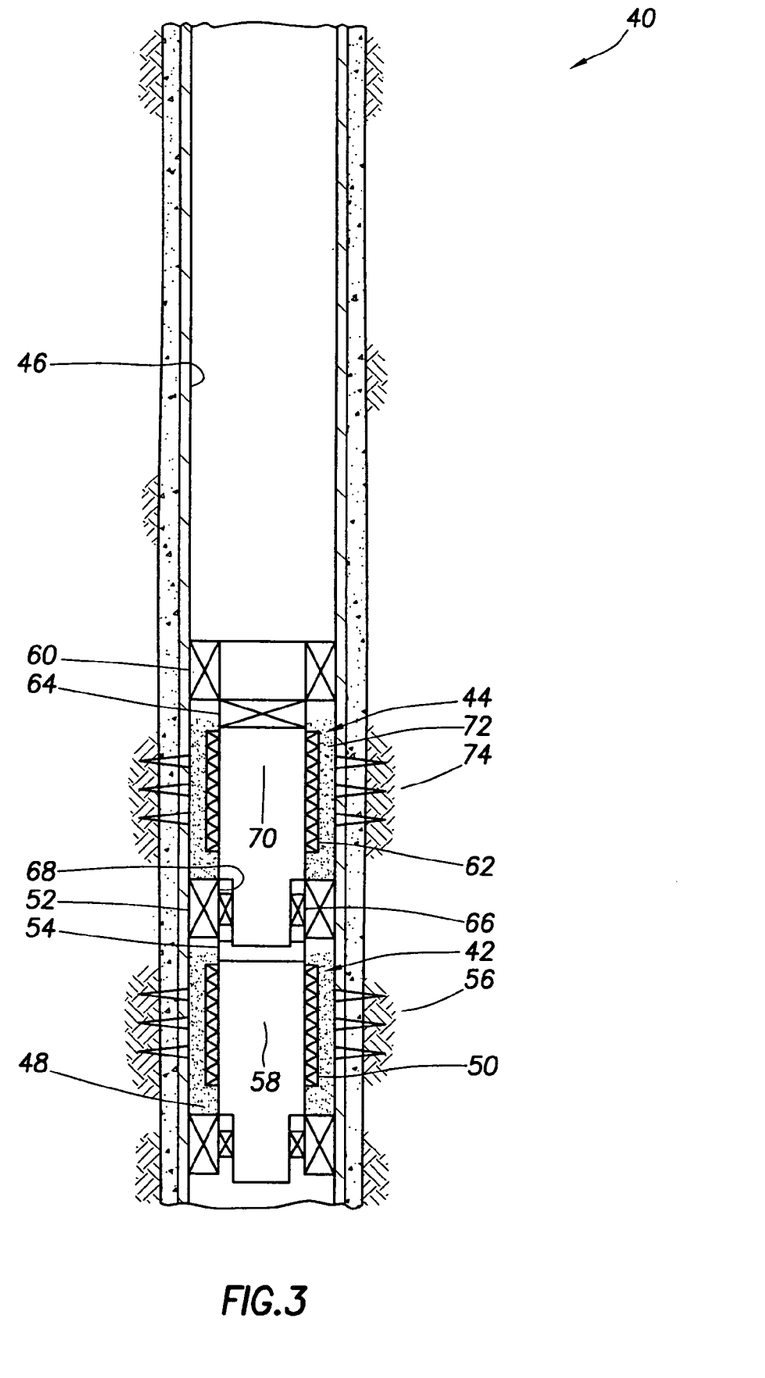
FIG. 3 is a schematic cross-sectional view of another system and method embodying principles of the present invention, in which initial steps of the method have been performed.

Referring additionally now to FIG. 3, another system and method 40 is representatively illustrated. In the system 40, multiple gravel packing assemblies 42, 44 are installed in a wellbore 46. Any number of gravel packing assemblies, or other types of well tool assemblies, may be installed in the wellbore 46 in keeping with the principles of the invention.

As depicted in FIG. 3, the gravel packing assemblies 42, 44 may both be installed in cased portions of the wellbore 46. However, it should be understood that all or any portion of the assemblies 42, 44 may be positioned in an uncased portion of the wellbore 46.

Preferably, the lower assembly 42 is installed first, a gravel pack packer 52 of the assembly is set in the wellbore 46, and a gravel packing operation is performed to place gravel 48 between a screen 50 of the assembly and the wellbore. Fluid from a formation or zone 56 intersected by the wellbore 46 can now flow through the gravel 48, inward through the screen 50 and into an interior flow passage 58 extending through the screen.

When a service tool (not shown) is retrieved from the assembly 42 after the gravel packing operation, a fluid loss control device 54 of the assembly is closed. The fluid loss control device 54 may be similar to the fluid loss control device 26 described above, and the fluid loss control device may be incorporated into the screen 50, in which case retrieval of the service tool may not affect operation of the device.

The upper gravel packing assembly 44 is then installed in the wellbore 46. The gravel packing assembly 44 is similar to the gravel packing assembly 42, in that it includes a gravel pack packer 60, a screen 62 and a fluid loss control device 64. A sealing device 66 carried at a lower end of the assembly 44 sealingly engages a seal bore 68 associated with the packer 52.

When the upper assembly 44 engages the lower assembly 42, the lower fluid loss control device 54 can be opened. This provides unimpeded communication between the passage 58 and another interior flow passage 70 formed longitudinally through the screen 62. Thus, the flow passages 58, 70 at this point can form a continuous flow passage extending through the assemblies 42, 44. Note that the fluid loss control device 54 may be opened before, during or after engagement between the assemblies 42, 44.

The packer 60 is set in the wellbore 46, and a gravel packing operation is performed to place gravel 72 between the screen 62 and the wellbore. Fluid from a formation or zone 74 intersected by the wellbore 46 can now flow through the gravel 72, inward through the screen 62 and into the flow passage 70.

When the gravel packing operation is completed and the service tool is retrieved from the assembly 44, the fluid loss control device 64 is preferably closed to prevent fluid flow from the wellbore 46 above the assemblies 42, 44 into either of the formations 56, 74. The fluid loss control device 64 may be similar to the fluid loss control device 26 described above, and the fluid loss control device may be incorporated into the screen 62, in which case retrieval of the service tool may not affect operation of the device.

Figure 4:
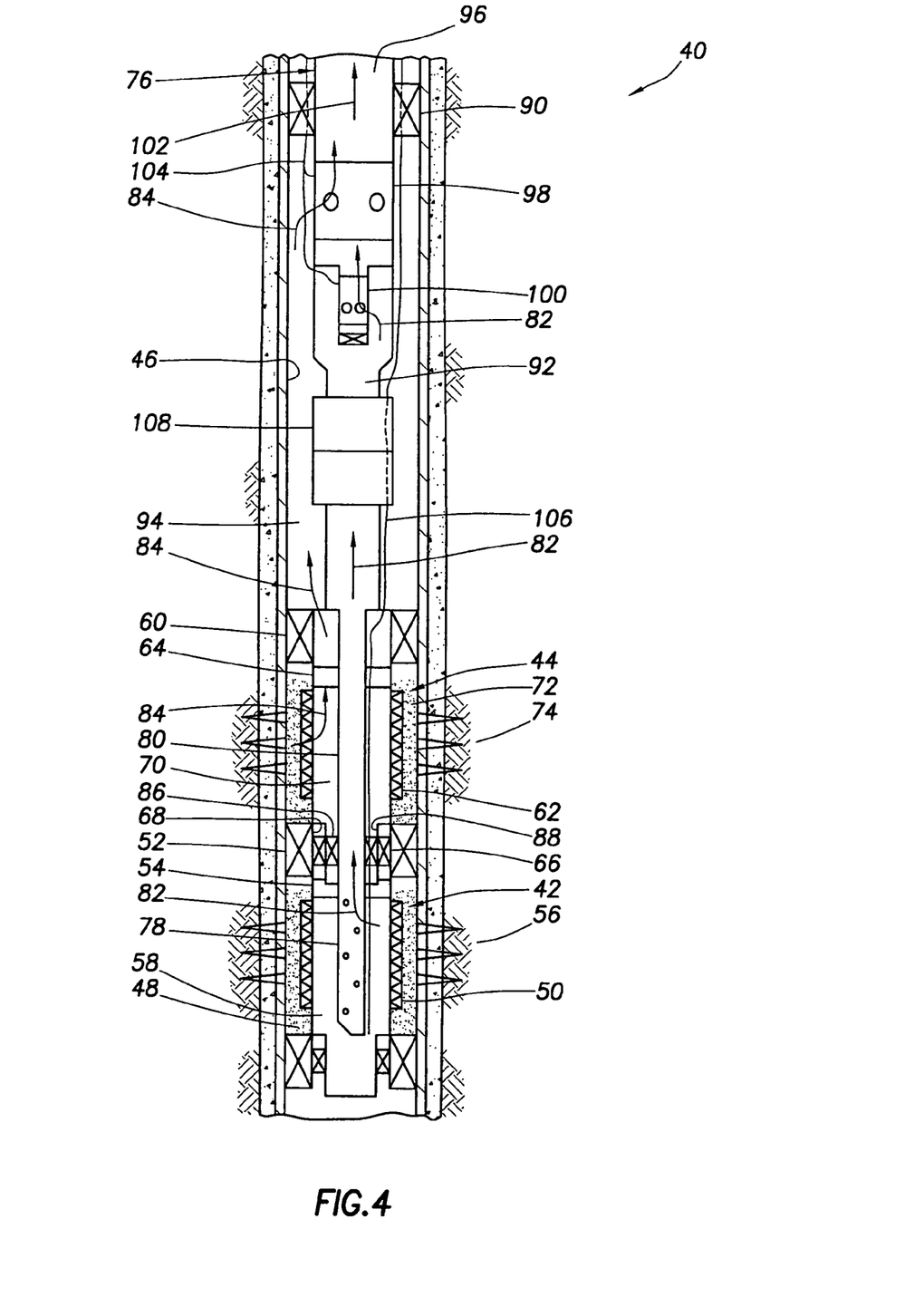
FIG. 4 is a schematic cross-sectional view of the system and method of FIG. 3, in which further steps of the method have been performed.

Referring additionally now to FIG. 4, a tubular string 76, such as a production tubing string, is installed in the wellbore 46 and engaged with the assemblies 42, 44. A packer go of the tubular string 76 is set to sealingly secure the tubular string in the wellbore 46.

Engagement between the tubular string 76 and the upper assembly 44 may open the fluid loss control device 64, permitting flow therethrough in each direction. The fluid loss control device 64 may be opened before, during or after engagement between the tubular string 76 and the upper assembly 44. Of course, if the fluid loss control device 64 is incorporated in the screen 62, such engagement may not affect operation of the device.

A lowermost portion 78 of the tubular string 76 extends into the passage 58 of the lower assembly 42, opening the fluid loss control device 54, if not previously opened. Another portion 80 of the tubular string 76 extends through the passage 70 of the upper assembly 44. Preferably, the portion 78 is perforated to enhance flow of fluid (indicated by arrows 82) into the tubular string 76 from the passage 58, and the portion 80 is not perforated to exclude flow of fluid (indicated by arrows 84) from the formation 74 into the portion 80.

A sealing device 86 carried on the tubular string 76 between the portions 78, 80 engages a seal bore 88 at a lower end of the assembly 44 and isolates the passages 58, 70 from each other in the assemblies 42, 44. Thus, the fluid 82 from the formation 56 flows inwardly through the screen 50, into the passage 58, and into the tubular string portion 78, which communicates with an interior portion 92 of the tubular string 76 above the assemblies 42, 44. Fluid 84 from the formation 74 flows inwardly through the screen 62, into the passage 70, and then into an annulus 94 formed between the tubular string 76 and the wellbore 46 above the assemblies 42, 44.

Flow between the annulus 94 and another interior portion 96 of the tubular string 76 is controlled by a remotely operable flow control device 98 interconnected in the tubular string. Flow between the lower interior tubular string portion 92 and the upper interior tubular string portion 96 is controlled by another remotely operable flow control device 100 interconnected in the tubular string. The flow control devices 98, 100 may be Interval Control Valves available from WellDynamics of Spring, Tex., or they may be any type of flow control devices, such as valves, chokes, etc.

With both of the flow control devices 98, 100 partially or completely open, the fluids 82, 84 are commingled (indicated by arrow 102) in the upper interior tubular string portion 96. The device 98 may be closed to prevent flow of the fluid 84 into the upper interior portion 96, and the device 100 may be closed to prevent flow of the fluid 82 into the upper interior portion of the tubular string 76. The devices 98, 100 may also be partially opened or closed (in the manner of a choke) to regulate the relative proportions of the fluid 102 contributed by each of the fluids 82, 84.

The flow control devices 98, 100 may be remotely operated by means of one or more hydraulic and/or electric lines or conduits 104 connected thereto, attached to the tubular string 76 and extending to a remote location, such as the earth's surface or another location in the well. In addition, a fiber optic line 106 is attached to the tubular string 76 and extends into the assemblies 42, 44. The fiber optic line 106 may be installed in a conduit attached to the tubular string 76, as described below.

The fiber optic line 106 extends longitudinally from a remote location, through the packer 90, through a telescoping travel joint 108 interconnected in the tubular string 76, through the passage 70, through the sealing device 86 and into the passage 58. For monitoring well parameters in the passages 58, 70, the fiber optic line 106 may have sensors connected thereto, or the fiber optic line may itself serve as a sensor, as described above.

Figure 5:
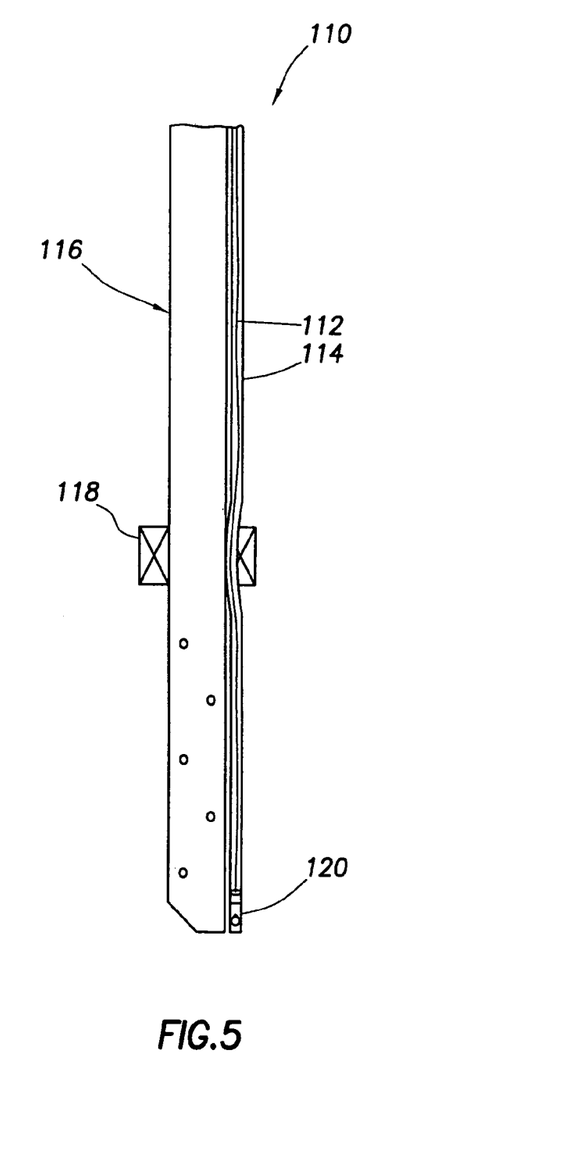
FIG. 5 is an enlarged partially cross-sectional view of a system and method of installing a fiber optic line in the systems and methods of FIGS. 1 & 3.

Referring additionally now to FIG. 5, a system and method 110 whereby a fiber optic line 112 may be installed in a conduit 114 attached to a tubular string 116 positioned in a well is representatively illustrated. The tubular string 116 is analogous to the tubular strings 28, 76 described above, and the fiber optic line 112 is analogous to the fiber optic lines 38, 106 described above.

When initially installed in the well, the tubular string 116 has the conduit 114 attached thereto. The conduit 114 may be positioned internal or external to the tubular string 116. The conduit 114 may extend through a sealing device 118, such as a packer or a packing stack or seal assembly, etc., or through any other well tool interconnected in the tubular string 116. The conduit 114 may be continuous, or it may be segmented, and portions of the conduit may be integrally formed in well tools, such as the device 118, interconnected in the tubular string 116.

After the tubular string 116 is positioned in the well, the fiber optic line 112 is extended through the conduit 114, for example, by pumping the fiber optic line through the conduit. A check valve 120 at a lower end of the conduit 114 permits fluid in the conduit to exit from the lower end of the conduit during the pumping operation. In this manner, the fiber optic line 112 is not subject to damage during installation of the tubular string 116 in the well.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A method for completing a subterranean well, the method comprising the steps of:
   positioning at least one gravel packing assembly in a wellbore of the well;
   then inserting a portion of a tubular string into an internal flow passage of the assembly, the inserting step including opening a fluid loss control device of the assembly;
   attaching a fiber optic line to the tubular string portion, the fiber optic line extending within the internal flow passage of the assembly; and
   gravel packing the wellbore about the assembly.

2. The method according to claim 1, wherein the attaching step is performed after the inserting step.

3. The method according to claim 1, wherein the attaching step further comprises pumping the fiber optic line through a conduit attached to the tubular string.

4. The method according to claim 3, wherein the pumping step is performed after the inserting step.

5. The method according to claim 1, wherein the inserting step is performed after the gravel packing step.

6. The method according to claim 1, wherein the positioning step further comprises positioning multiple ones of the assembly in the wellbore, wherein the inserting step further comprises inserting the tubular string portion into each of the assemblies, and wherein the attaching step further comprises attaching the fiber optic line to the tubular string portion so that the fiber optic line extends in each of the assemblies.

7. The method according to claim 6, further comprising the step of sealingly engaging the tubular string in the assemblies, thereby isolating the flow passages formed through the assemblies from each other.

8. The method according to claim 7, wherein the tubular string includes multiple flow control devices, and further comprising the step of controlling flow between an interior portion of the tubular string and each of the flow passages with a respective one of the flow control devices.

9. A system for completing a subterranean well, the system comprising:
 an assembly positioned in a wellbore of the well;
 a tubular string having a portion inserted into an internal flow passage of the assembly after the assembly is positioned in the wellbore, and a fluid loss control device of the assembly opening in response to insertion of the tubular string portion into the assembly; and
 a fiber optic line attached to the tubular string portion and extending in the internal flow passage of the assembly.

10. The system according to claim 9, wherein the assembly is a gravel packing assembly.

11. The system according to claim 9, wherein at least a portion of the assembly is positioned in an uncased portion of the wellbore.

12. The system according to claim 9, wherein the fiber optic line extends through a sealing device of the tubular string, the sealing device sealingly engaging the assembly.

13. The system according to claim 12, wherein the sealing device isolates the interior flow passage of the assembly from an annulus formed between the tubular string and the wellbore.

14. The system according to claim 9, wherein the tubular string portion is perforated.

15. The system according to claim 9, wherein the fiber optic line extends through a packer interconnected in the tubular string.

16. The system according to claim 9, wherein the system includes multiple ones of the assembly, and wherein the tubular string portion and the fiber optic line are inserted into each of the assemblies.

17. The system according to claim 16, wherein the assemblies are sealed to each other in the wellbore.

18. The system according to claim 16, wherein sealing engagement between the assemblies forms the internal flow passage which extends continuously through the assemblies.

19. The system according to claim 18, wherein the tubular string portion and the fiber optic line are inserted into the flow passage.

20. The system according to claim 18, wherein a sealing device carried on the tubular string isolates the flow passage in one of the assemblies from the flow passage in another of the assemblies.

21. The system according to claim 9, wherein the fiber optic line extends through a telescoping travel joint interconnected in the tubular string.

22. The system according to claim 9, wherein the fiber optic line is contained in a conduit attached to the tubular string.

23. The system according to claim 22, wherein the fiber optic line is pumped into the conduit after the tubular string portion is inserted into the assembly.

24. The system according to claim 23, wherein the conduit includes a check valve which permits outward fluid flow from the conduit at the tubular string portion.

25. A system for completing a subterranean well, the system comprising:
 at least first and second assemblies positioned in a wellbore of the well;
 a tubular string having a portion inserted into an internal flow passage extending in both of the first and second assemblies after the first and second assemblies are positioned in the wellbore;
 a fiber optic line attached to the tubular string portion; and
 first and second flow control devices interconnected in the tubular string, the first flow control device controlling flow between the flow passage in the first assembly and a first interior portion of the tubular string, and the second flow control device controlling flow between the flow passage in the second assembly and the first interior portion of the tubular string, and the first flow control device controlling flow between the first interior portion of the tubular string and a second interior portion of the tubular string in communication with the flow passage in the first assembly.

26. The system according to claim 25, wherein the tubular string receives fluid flowed from each of the first and second assemblies.

27. The system according to claim 25, wherein each of the first and second assemblies is a gravel packing assembly.

28. The system according to claim 25, wherein a sealing device carried on the tubular string isolates the flow passage in the first assembly from the flow passage in the second assembly.

29. The system according to claim 25, wherein operation of each of the first and second flow control devices is controlled from a remote location.

30. The system according to claim 25, wherein the first flow control device is positioned within the tubular string.

31. The system according to claim 25, wherein the fiber optic line extends through a telescoping travel joint interconnected in the tubular string.

32. The system according to claim 25, wherein the fiber optic line extends through a packer interconnected in the tubular string.

33. The system according to claim 25, wherein the fiber optic line extends through a seal assembly on the tubular string which sealingly engages at least one of the first and second assemblies.

34. The system according to claim 25, wherein the fiber optic line is positioned in a conduit attached to the tubular string portion.

35. The system according to claim 34, wherein the fiber optic line is pumped into the conduit after the tubular string is inserted into the first and second assemblies.

36. The system according to claim 35, wherein the conduit includes a check valve which permits outward fluid flow from the conduit at the tubular string portion.

37. A system for completing a subterranean well, the system comprising:
 at least first and second assemblies positioned in a wellbore of the well, the first assembly including a first fluid loss control device;
 a tubular string having a portion inserted into an internal flow passage extending in both of the first and second assemblies after the first and second assemblies are positioned in the wellbore, the first fluid loss control device selectively permitting and preventing flow through the passage; and a fiber optic line attached to the tubular string portion, and wherein the first fluid loss control device opens in response to engagement between the first and second assemblies in the wellbore.

38. The system according to claim 37, wherein the second assembly includes a second fluid loss control device.

39. The system according to claim 38, wherein the second fluid loss control device opens in response to engagement between the tubular string and the second assembly in the wellbore.

* * * * *